United States Patent [19]

Yonahara et al.

[11] Patent Number: 4,562,113
[45] Date of Patent: Dec. 31, 1985

[54] ELECTRICALLY CONDUCTIVE PLASTIC COMPLEX MATERIAL

[75] Inventors: Kunio Yonahara, Yokohama; Shingo Aimoto, Tokyo, both of Japan

[73] Assignee: Kabushiki Kaisha Meidensha, Tokyo, Japan

[21] Appl. No.: 565,340

[22] Filed: Dec. 27, 1983

[30] Foreign Application Priority Data

Dec. 27, 1982 [JP] Japan ................................ 57-227117

[51] Int. Cl.$^4$ ..................... B32B 9/00; C25B 11/12; H01M 6/48; H01M 10/18
[52] U.S. Cl. ................................... 428/331; 428/408; 428/451; 428/523; 204/280; 204/294; 429/210; 429/122
[58] Field of Search ............... 428/408, 331, 451, 523; 204/294, 280; 429/210, 122

[56] References Cited

U.S. PATENT DOCUMENTS

| | | | |
|---|---|---|---|
| 4,124,747 | 11/1978 | Murer et al. | 428/220 X |
| 4,139,675 | 2/1979 | Nagai et al. | 428/408 |
| 4,219,602 | 8/1980 | Conklin | 428/408 |
| 4,269,892 | 5/1981 | Shattuck et al. | 428/408 |
| 4,293,450 | 10/1981 | Vogel | 252/503 |
| 4,388,227 | 6/1983 | Kalnin | 252/510 |
| 4,411,945 | 10/1983 | Akao et al. | 428/408 |
| 4,421,678 | 12/1983 | Mehta | 252/511 |

*Primary Examiner*—Patricia C. Ives
*Attorney, Agent, or Firm*—Fleit, Jacobson, Cohn & Price

[57] ABSTRACT

Described is a degradation-resistant electrode for an electrochemical reaction comprising an electrically conductive plastics complex material comprising 18 to 50 wt. percent of the polyolefin polymer, 1 to 25 wt. percent of the electrically conductive carbon black and 25 to 75 wt. percent of one or more of graphite, calcium carbonate, talcum, alumina, silica and titania.

2 Claims, No Drawings

ELECTRICALLY CONDUCTIVE PLASTIC COMPLEX MATERIAL

Cross-reference is hereby made to a related application having the same Assignee, U.S. Ser. No. 551,899, filed Nov. 15, 1983.

BACKGROUND OF THE INVENTION

This invention relates to an electrically conductive plastics or plastic complex material that is used as an electrode in an electrolytic solution and undergoes lesser deterioration therein with lapse of time.

The plastic complex materials used in electrolytes (electrolytic solutions) tend to be affected by materials produced upon electrolysis and thus undergo certain chemical degradation. This tendency is most outstanding especially in cases wherein the substances produced upon electrolysis are halogen group elements such as chlorine or bromine.

The term electrolytic solution as used in the present specification is intended to mean the electrolyte used in storage battery as well as electrolyte for dry battery or electroplating accompanying electrochemical reactions. It is an aqueous solution of compounds of a halogen group element selected from the group consisting of F, Cl, Br and I with at least one alkali or alkali earth metals such as Li, Be, Na, Mg, K, Ca, Rb, Sr, Cs or Ba in addition to metals such as Zn, Cu, Ni, Co, Fe, Mn, Cr, Sn, Pb, Pt, Hg, Cd, Ag or Pd.

The inventive materials may also be used with electrolytes from which strong acid groups, substances that extract hydrogen from hydrocarbons in the plastic complex material, strongly reductive agents, or compounds such as strong alkali that may act as hydrolytic agent, such as $O$, $O_2$, $O_3$, $S$, $SO_2$, $SO_3$, $SO_4$, $ClO_3$, $CrO_3$, $OH$, $O_2H$ or $MnO_3$ are produced upon decomposition of the electrolytes.

In general, when dipped in these electrolytes or exposed in chlorine or bromine liquids for accelerated degradative tests, the plastic complex material may become swollen in a short period and broken up into pieces which is extremely undesirable from the standpoint of dimensional stability and mechanical strength.

This means that the plastic complex material is subject to molecular cleavage or disruption when acted on by electrolytic products such as chlorine or bromine thus leading finally to failure of the material.

SUMMARY OF THE INVENTION

It is an object of the present invention to provide an electrically conductive plastic material that has a long life time and is not degraded when used in electrolytes with lapse of time.

In view of such object, the present invention relates to an electrically conductive plastic complex material comprising synthetic resin base material added with electrically conductive carbon black and inorganic filler, and characterized in that the inorganic filler is at least one selected from the group consisting of graphite, calcium carbonate, talcum, alumina, silica and titania, said mixture being kneaded together. The synthetic resin base material is a polyolefin with density higher than 0.94g/cm$^3$ at room temperature. According to the invention, it may be preferred that polyolefin, electrically conductive carbon black and the inorganic filler be in the range of 18–50, 1–25 and 25–75 wt. percents, respectively.

DESCRIPTION OF THE PREFERRED EMBODIMENT

The present inventors conducted research into possible additives that will enable the ultimate plastic complex material exposed to electrolytes to be more durable and less susceptible to the electrolytes.

Thus a zinc bromide aqueous solution has been selected as electrolyte because it produces bromine (which is most aggressive) and also because it may be present as bromine aqueous solution when electrolyzed. A variety of polyolefins have been tested as to their durability to electrolytic products.

It is seen form the Examples described below that the electrically conductive plastic complex material comprising a mixture of the synthetic base resin material, electrically conductive carbon black and at least one of calcium carbonate, talcum, alumina, silica and titania as inorganic filler shows extremely divergent properties according as the polyolefin density lies above or below a critical value of 0.94 g/cm$^3$ in polyethylene.

From this it has been confirmed that the durability of polyolefin to chemicals is closely related to the degree of crystallinity of the polyolefin employed and remains unaffected by the particular polymer type (such as block polymer or random polymer) and that the aforementioned critical effects may be derived solely by regulating the density of the synthetic base resin material.

Thus, the higher the density of the polyolefin employed, the better will be the durability of the resulting material to electrolytic products. However, as the polyolefin density is increased, the rate of increase in stability of the ultimate material is gradually lowered. On the other hand, the ultimate plastic complex material is lowered in formability with increase in density. Therefore it is desirable as a practical matter that polyolefin density be in the range of about 0.94 g/cm$^3$ to 0.98 g/cm$^3$ in polyethylene.

When inorganic filler is to be added to the composition of the inventive material, it may be preferred that polyolefin, electrically conductive carbon black and the inorganic filler be in the ranges of 18 to 50, 1 to 25 and 25to 75 wt. percents, respectively.

The present invention will be described further by referring to the Examples below.

In evaluation, referential dumbbell samples (thickness, about 1 mm) were prepared in accordance with JIS Z 1703 and their tensile strength was measured with the use of a tensile tester. The relation between the tensile strength of the tested sample and that of the untested sample was expressed in terms of the tensile strength retention ratio (percent).

The test is the accelerated degradative test in which each sample was immersed in 94%-bromine solution for 1000 hours at room temperature.

The names and certain physical properties of the synthetic resin material (A), electrically conductive carbon black (B) and the inorganic filler (C) used in the Examples are shown in the following Table 1.

TABLE 1

Names and Properties of Components

Physical properties

TABLE 1-continued

Names and Properties of Components

| | | | Commercial Name | Maker | Density (g/cm³) | m.p. (°C.) | Softening point (°C.) | MFR (g/10 min) | Ex. No. |
|---|---|---|---|---|---|---|---|---|---|
| Synthetic resin material(A) Polyethylene | | $A_4$ | Stafren E 908(F) | Nippon Sekiyu Kagaku K.K. | 0.950 | 129 | | 0.08 | 1, 2, 8 |
| | | $A_5$ | Stafren E 703 | Nippon Sekiyu Kagaku K.K. | 0.961 | 129 | | 0.3 | 3 |
| | | $A_6$ | Showrex S6006M | Showa Denko K.K. | 0.957 | | 128 | 0.5 | 4, 9 |
| | | $A_3$ | S6008 | Showa Denko K.K. | 0.958 | | 129 | 0.8 | 5, 6 |
| | | $A_7$ | Showrex S4002 | Showa Denko K.K. | 0.935 | | 119 | 0.2 | 7 |
| Elec. cond. carbon black (B) | | | | | Absorption (ml/100 g) | | $N_2$ Surface Area (m²/g) | | |
| | | $B_4$ | CONDUCTEX −950 | Nippon Columbia K.K. | 175 | | 245 | | 1, 2, 8 |
| | | $B_2$ | Ketchen black EC | Lion Acso K.K. | 350 | | 950 | | 3, 5, 6, 7 |
| | | $B_1$ | VULCAN XC −72 | CABOT | 166 | | 272 | | 4 |

| | | | Commercial Name | Maker | Powder particle size | Analysis (wt. %) | | | | | | Ex. No. |
|---|---|---|---|---|---|---|---|---|---|---|---|---|
| | | | | | | $SiO_2$ | MgO | $Al_2O_3$ | $Fe_2O_3$ | CaO | Ig.loss | |
| Inorganic filler (C) | Talcum | $C_{2-2}$ | MS | Talcum K.K. | −350 mesh | 62.3 | 31.7 | 0.1 | 0.8 | 0.2 | 4.9 | 4 |
| | | | | | | Specific gravity | mean particle size(μm) | particle size | | Surface area (cm²/g) | | |
| | Crystalite | $C_3$ | Crystalite AA | K.K. Tatsumori | | 2.6 | 1.9 | +200 mesh | +325 mesh | 18000 | | 5 |
| | Soda Alumina | $C_4$ | low soda alumina AL-15 | Showa Keikinzoku K.K. | | 3.99 | | 10% | 70% | | | 6, 9 |
| | $TiO_2$ | $C_5$ | Taipek R 680 | Ishihara Sangyo K.K. | | 4.2 | 0.213 | | | | | 8 |

EXAMPLE

The materials of the compositions shown in Table 2 below were kneaded together in a Banbury mixer and pelletized in a pelletizer. The resulting products were pressed by a heating press into 100×100 mm sheets each 1 mm thick. The pressing conditions were 200° C. temperature and 300 kg/cm² pressure.

The compositions (in wt. percents) for the present Example are shown in Table 2.

TABLE 2

| | Compositions (wt. %) Mat. | | | |
|---|---|---|---|---|
| Test No. | synth. resin mat. (A) | elec. cond. carb. black (B) | inorg. filler (C) | dens. of synth. resin mat. (g/cm³) |
| 1 | $A_4$ 45.5 | $B_4$ 54.5 | — | 0.950 |
| 3 | $A_5$ 95.2 | $B_2$ 4.8 | — | 0.961 |
| 4 | $A_6$ 40.0 | $B_1$ 20 | $C_{2-2}$ 40 | 0.957 |
| 5 | $A_3$ 24.7 | $B_2$ 1.2 | $C_3$ 74.1 | 0.958 |
| 6 | $A_3$ 48.8 | $B_2$ 2.4 | $C_4$ 48.8 | " |
| 8 | $A_4$ 50.0 | $B_4$ 25.0 | $C_5$ 25.0 | 0.950 |
| 9 | $A_6$ 18.2 | $B_1$ 9.1 | $C_4$ 72.7 | 0.957 |
| 2 | $A_4$ 43.5 | $B_4$ 56.5 | — | 0.950 |
| 7 | $A_7$ 95.2 | $B_2$ 4.8 | — | 0.935 |

Test results for the sheet are shown in Table 3.

TABLE 3

| | Test Results properties | |
|---|---|---|
| Test No. | vol. resis. (ohm · cm) | tens. str. ret. ratio (%) |
| 1 | 0.8 | 87 |
| 3 | 2 × 10² | 98 |
| 4 | 2.2 | 97 |
| 5 | 3 × 10² | 97 |
| 6 | 3 × 10² | 96 |
| 8 | 3.8 | 85 |
| 9 | 2.5 | 96 |
| 2 | test piece not made | test piece not made |
| 7 | 1.8 × 10² | 40 |

It is seen from the test results shown in Table 3 that the sheet manufactured from a mixture of polyethylene with density higher than 0.94 g/cm³ and at least one additive selected from the group consisting of calcium carbonate, talcum, alumina, silica and titania has an improved tensile strength retention ratio over the sheet manufactured from a mixture of polyethylene with density not higher than 0.94 g/cm³ and not containing these additives.

It is seen from the Example 2 that the plastic complex material becomes difficult to form a sheet when more than 120 wt. parts of carbon black are added to 100 wt. parts of polyethylene.

What is claimed is:

1. An electrically conductive plastic complex material, said material being used as an electrode for an electrochemical reaction, said material consisting essentially of:

a polyethylene polymer having a density of from 0.94 to 0.98 g/cm$^3$,
an electrically conductive carbon black; and
an inorganic filler selected from the group consisting of calcium carbonate, talcum, alumina, silica, titania and mixtures thereof, wherein the filler has a particle size of 200 mesh or less.

2. An electrically conductive plastic complex material as claimed in claim 1 wherein the polyethylene polymer is present in an amount of 18 to 50 percent by weight, wherein the conductive carbon black is present in an amount of 1 to 25 percent by weight and wherein the inorganic filler is present in an amount of 25 to 75 percent by weight.